United States Patent [19]

Hawkins

[11] 3,908,765

[45] Sept. 30, 1975

[54] FLOATING POSITION PROPORTIONAL CONTROL SYSTEM

[75] Inventor: Royal R. Hawkins, Bloomington, Minn.

[73] Assignee: Honeywell Inc., Minneapolis, Minn.

[22] Filed: Mar. 1, 1973

[21] Appl. No.: 337,228

[52] U.S. Cl. .................. 172/4.5; 318/587; 318/667
[51] Int. Cl.² .......................................... E02F 3/76
[58] Field of Search .......... 172/4.5, 4; 318/587, 667

[56] References Cited
UNITED STATES PATENTS

| | | | |
|---|---|---|---|
| 2,965,990 | 12/1960 | Allele.................................. | 172/4.5 |
| 3,026,638 | 3/1962 | Hayner et al. ........................ | 172/4.5 |
| 3,637,026 | 1/1972 | Snow................................... | 172/4.5 |
| 3,674,094 | 7/1972 | Kuntz.................................. | 172/4.5 |

*Primary Examiner*—Stephen C. Pellegrino
*Attorney, Agent, or Firm*—Trevor B. Joike

[57] ABSTRACT

A floating position proportional control system for positioning a working tool of a road machine comprises a sensor for producing a signal indicative of the deviation of the working tool from a reference, a feedback potentiometer having a floating range, an amplifier for producing a signal representative of the error existing between the sensor signal and the signal from the feedback and an output for positioning the working tool according to said error signal. The feedback potentiometer has mechanical stops at either end and the wiper arm is frictionally driven such that when the wiper arm reaches one of the mechanical stops the drive will slip and the wiper arm will move no further.

10 Claims, 4 Drawing Figures

FLOATING POSITION PROPORTIONAL CONTROL SYSTEM

This invention relates to a floating position proportioning system for controlling the position of a working tool of a road machine. In particular, such a road machine may be a grader, although it can take the form of other types of machines such as pavers. In the preferred embodiment, the control systems for graders comprise a string-line for establishing a predetermined reference plane and a grade sensor for sensing the deviation of the machine tool from the reference established by the string-line and for supplying an appropriate control signal for repositioning the tool, i.e. blade, of the grader to null out any error signal. The concept herein, however, can be applied to any control axis (e.g. slope) of the machine. These control systems can be characterized as integrating systems which attempt to null out all of the error signal. The advantage of an integrating system is that it can position the controlled tool through a large range attempting to reduce the error signal. The failing of such a system is that it has very high gain and tends to hunt the string-line causing overshoot and oscillation.

The prior art, to correct for this failing problem, reduced the gain by providing a feedback potentiometer connected to the grade sensor in a bridge network. The output from the bridge network supplied a control amplifier. This feedback potentiometer was used to give a signal proportional to the position of the blade with respect to the machine. Since the gain was reduced, the response rate was also reduced.

The intent of this invention is to combine the advantages of both the integrating system and the proportional system to provide stability yet an increase in response rate.

SUMMARY OF THE INVENTION

A sensor is provided for producing an output signal indicative of the deviation of the working tool of a road machine for a pre-established reference. This signal is amplified and used to control an output for positioning the tool of the machine. A feedback potentiometer senses the position of the tool with respect to the machine and provides a signal representative of this position to the input of the amplifier. The feedback potentiometer has mechanical stops at both ends and a friction drive for the wiper. When the wiper has moved a predetermined distance from its midpoint, as determined by the mechanical stops, the mechanical stops prevent any further movement of the wiper arm and the friction drive merely slips. When the error signal from the amplifier changes in the opposite sense, the working tool is then oppositely repositioned and the wiper arm will move in an opposite direction.

In such a system, as long as deviations are small, the response is position proportioning; but if the deviations are large, the positional response is integrating.

The invention can be better understood from a consideration of the detailed description herein below in connection with the drawings in which.

Figure 1:
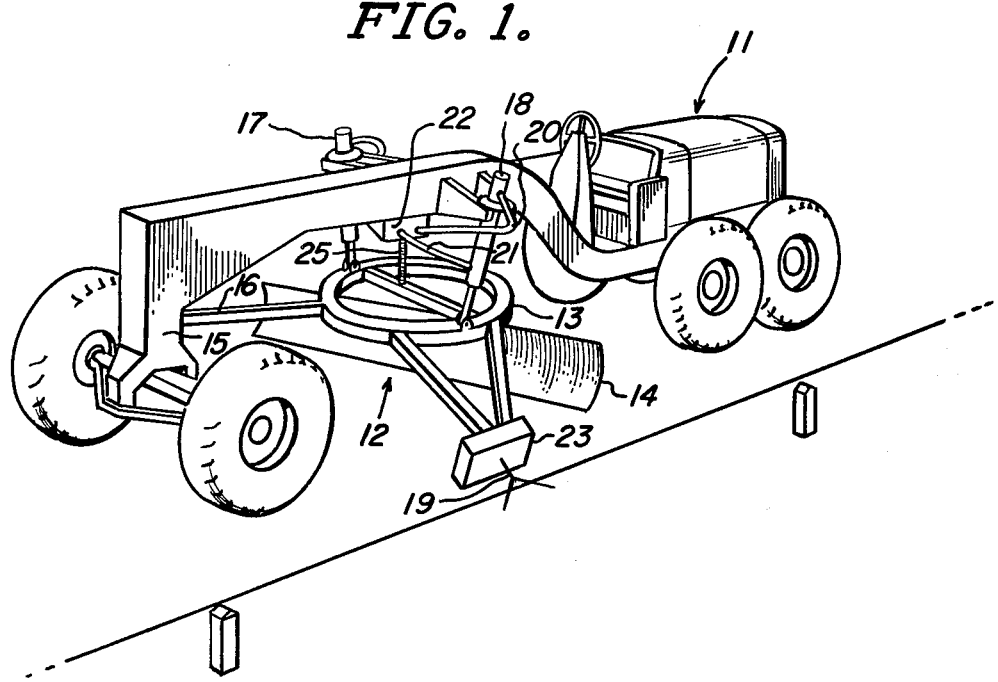
FIG. 1 shows a typical machine on which the disclosed invention can be used for control purposes.

FIG. 1 shows a grader having a road working machine frame 11 and having a blade circle support frame 12 comprising a blade circle 13 and the blade 14. The circle 13 is suspended from the front end 15 of the grader by means of a drawing bar 16. The blade circle is also suspended by hydraulic cylinders 17 and 18. Hydraulic cylinder 18 is supplied with hydraulic fluid over lines 20 and 21 and hydraulic cylinder 17 is supplied with hydraulic fluid over a similar set of hydraulic lines. The hydraulic fluid in lines 20 and 21 is controlled by control box 22. Supported by the blade circle 13 is a grade sensor 23 for sensing a pre-established reference such as string-line 24.

Figure 2:
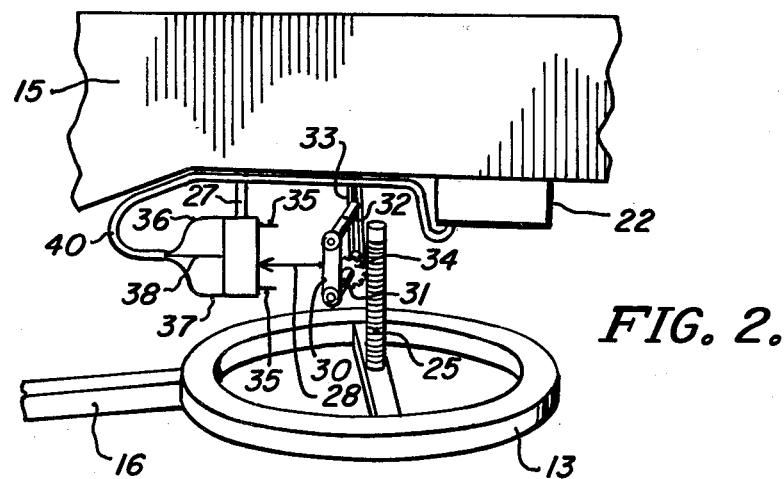
FIG. 2 is an exploded portion of FIG. 1 showing the details of the feedback potentiometer and its friction drive.

FIG. 2 shows in more detail the feedback potentiometer and its relationship to the other parts of the machine. The feedback potentiometer 26 is supported by the machine 11 by way of a support arm 27. Potentiometer 26 has a wiper arm 28 which is driven by a friction belt 30. The friction belt is driven by a roller 31 and supported at its other end by a roller 32, both rollers being supported rotatably by a bar 33. The roller 31 is driven by a rack and pinion arrangement comprising rack 25 and pinion 34. The wiper arm 28 is permitted movement over the potentiometer 26 but is limited by stops 35. When the wiper arm hits a stop 35, the roller 31 will continue to rotate but the belt 30 will slip over the roller and the wiper arm 28 will be maintained stationary at the stop 35.

Potentiometer 26 is supplied with electrical power over lines 36 and 37 and the voltage on wiper 28 is taken off by line 38. All three lines, 36, 38, and 37, form a cable 40 which is fed into the control box 22.

Figure 3:
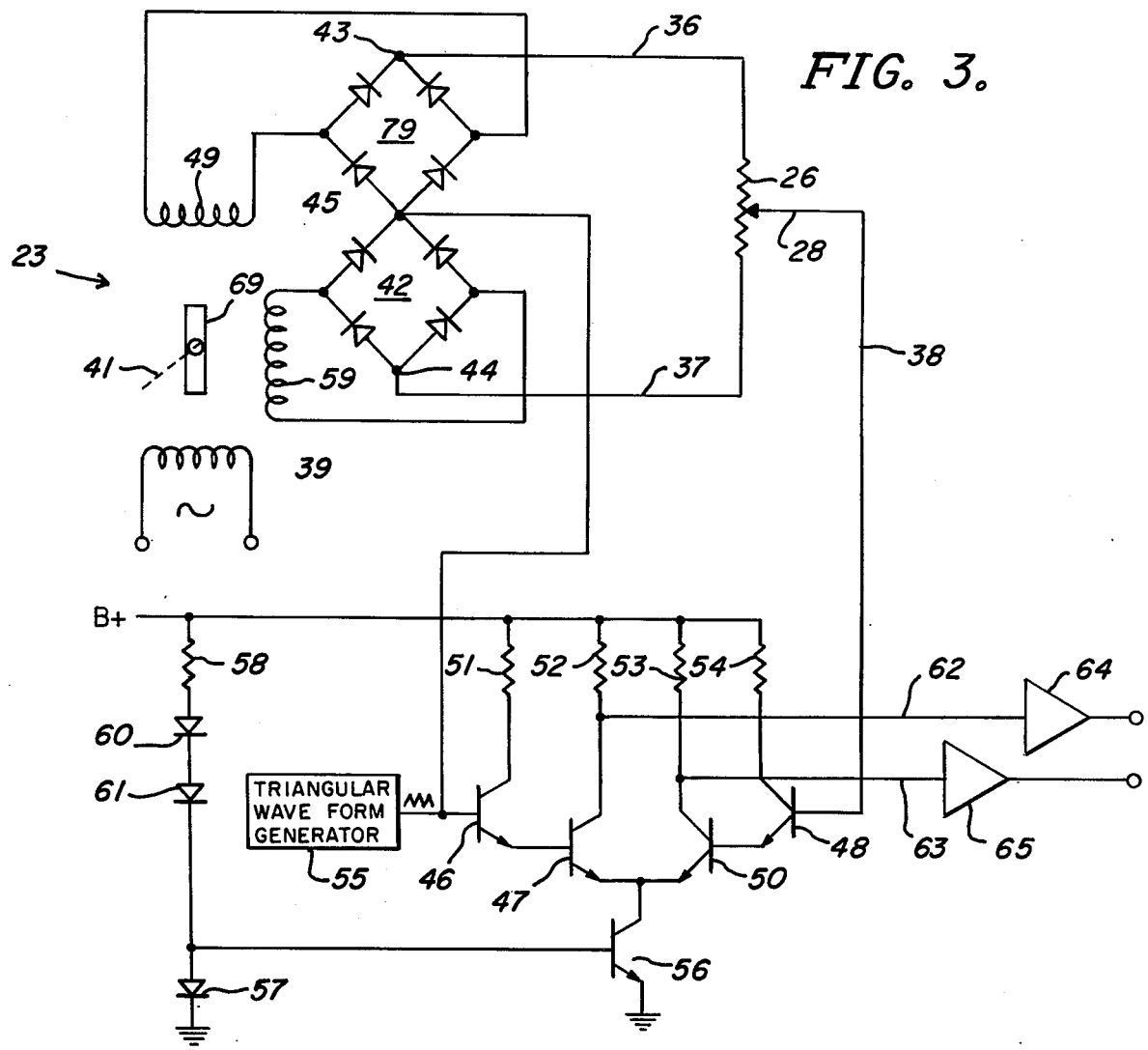
FIG. 3 is a detailed showing of the control circuit.

The rack 25 is supported by the blade circle 13 such that, as the blade circle 13 moves up and down with respect to the machine, the rack 25 will drive pinion 34 to drive the belt 30. FIG. 3 shows the detailed control circuitry for combining the sensor signal from sensor 23 and the feedback signal from potentiometer 26 to control the position of the blade 14 with respect to the machine 11. The sensor 23 comprises a primary winding 39 and two secondary windings 49 and 59. A movable core 69 is mechanically attached at 41 to the string follower 19 shown in FIG. 1 and is rotated by the movements of that follower. The position of core 69 controls the relative voltage across secondaries 49 and 59. Secondary 49 is connected across a rectifier bridge 79 and secondary 59 is connected across rectifying bridge 42. The opposite ends of each bridge, i.e. 43 and 44 respectively, are connected across the ends of potentiometer 26 and the common connection 45 of the bridges is connected to the base of transistor 46 the emitter of which is connected to the base of transistor 47. The wiper arm 28 of potentiometer 26 is connected to the base of a transistor 48 which has its emitter connected to the base of another transistor 50. The collectors of transistors 46, 47, 48 and 50 are connected through resistors 51, 52, 53 and 54 respectively to B+. The base of transistor 46 is also connected to a triangular waveform generator 55. The emitters of transistors 47 and 50 are connected through the collector emitter circuit of transistor 56 to ground whereas the base of transistor 56 is connected to ground through a diode 57. B+ is connected to the base of transistor 56 through a resistor 58 and diodes 60 and 61. The detailed description of the operation of the circuit can be found in U.S. Pat. No. 3,674,094 which is assigned to the same assignee as the instant invention. The outputs are taken on lines 62 and 63 and fed through amplifiers 64 and 65. Each amplifier output is connected through a servo-actuator which respectively controls the hydraulic fluid supplied to hydraulic cylinders 17 and 18 to thus control the position of the grader blade 14.

As the grader 11 proceeds along its path grading a roadway, small deviations of the blade 14 from the reference established by string-line 24 will result in the control system proportionally repositioning the blade 14. The blade can change position with respect to line 24 by a number of ways. For instance, the tires of the grader 11 might encounter either a depression or a rise in the land. Also, if the blade 14 digs into heavy earth, the blade will tend to pull the machine 11 down thus compressing the tires. In any event, as long as such deviations are within the proportional band of the control circuit, the blade position will change proportionally to the deviation.

If a large deviation occurs, however, the blade 14 position will change sufficiently with respect to the machine to cause the rack and pinion arrangement to drive the wiper arm 38 of the feedback potentiometer 26 against one of the stops 35. The control action is proportional until the wiper arm 28 meets the stop 35 and then the control action is integral thereafter.

Figure 4:
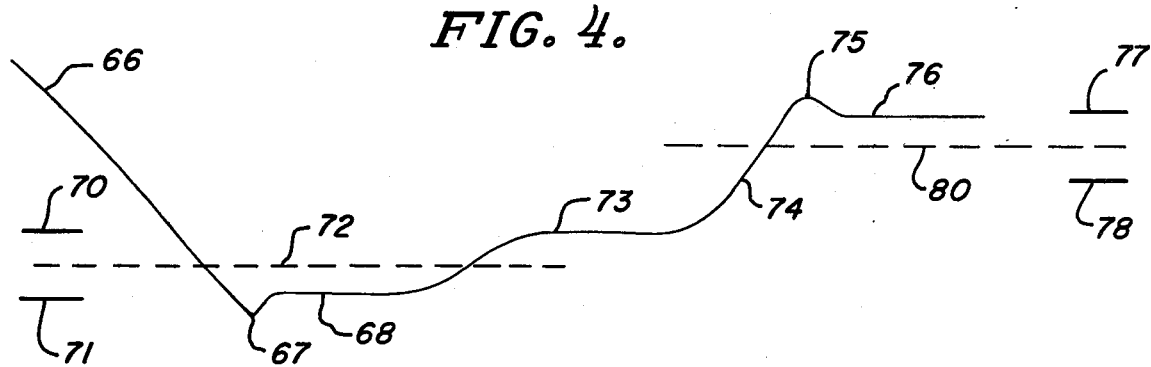
FIG. 4 is a graph showing a typical working tool travel with respect to the machine.

FIG. 4 shows the typical deviations which a machine might encounter and shows the corrective actions which are taken for these deviations. Assuming the machine met a large obstacle, the orientation of core 69 would be altered substantially by follower 19 which produced a large error signal and subsequent movement of the hydraulic cylinders to reposition the blade 14. The line 66 in FIG. 4 shows the movement of such a hydraulic cylinder. As the system corrects for the large deviation, the hydraulic cylinder is moved along the path 66 until it reaches a position where the string follower has repositioned the core 69 to null out the signal on the wiper 28. Since the system is responding quickly and since the action is an integral action, there is an over-shoot at point 67 but a steadying out at point 68. During the travel at 66 and since the deviation was quite large, the wiper arm 28 was prevented from movement by one of the mechanical stops 35. As the hydraulic cylinder reached the point 67 in its travel it began movement the other way to correct for the overshoot. When the hydraulic cylinder began movement the other way, the wiper arm would then begin movement in that other way from the stop until it settled out at the point 68. During this part of the travel, lines 70 and 71 indicate the proportional band and line 72 indicates a zero null position. Since this is a position proportional system, there must exist an error signal between null 72 and the actual position 68 in order to position the blade 14 at positions other than null position 72.

Assuming now that the grader meets another obstacle which causes a deviation, the hydraulic cylinder will move to a new point 73. As the hydraulic cylinder moves, so moves the blade circle 13 and rack 25 thus repositioning wiper arm 28. Since the initial deviation was small, the point 73 is within the proportional band 70-71 and the wiper arm 28 will come to rest somewhere between the mechanical stops 35.

Assume now that the machine meets another large deviation which causes it to follow the path 74. As soon as the wiper arm 28 reaches a mechanical stop 35, the action becomes integral action and the blade 14 is quickly positioned. But since there is integral action, there will be tendency to over-shoot as shown at point 75. At point 75, the hydraulic cylinder will attempt to reposition the blade to a point 76 and the wiper arm 28 will then move a corresponding amount off of the mechanical stop 35 against which it had been resting. Thus, a new proportional band 77-78 is established having a zero null 80 and the feedback potentiometer may be described as one having a floating proportional range.

As changes can be made in the above-described construction and many apparently different embodiments of this invention can be made without parting from the scope itself, it is intended that all matter contained in the above description as shown in the accompanying drawings be interpreted as illustrative only and not in a limiting sense.

I claim:

1. In a system for positioning the working tool of a road working machine with respect to a predetermined reference, said machine comprising a machine frame and a blade circle support frame, said system comprising:

sensor means mounted on said road working machine for producing a sensor signal indicative of the deviation of said working tool from the predetermined reference;

feedback means mounted on said road working machine having a floating range for producing a feedback signal dependent upon the position of said working tool with respect to said machine, said floating range having a limited proportional range and an integral range;

means connected to said sensor means and said feedback means for providing an output signal dependent upon said sensor signal and said feedback signals; and, position control means for controlling the position of said working tool dependent upon said output signal.

2. The system of claim 1 wherein said means connected to said sensor means and said feedback means comprises amplifer means having input means connected to said sensor means and said feedback means and an output means for providing said output signal.

3. The system of claim 2 wherein said feedback means comprises a stationary element and a moveable element positionable, with respect to said stationary element, by a drive means responsive to the position of said machine with respect to said working tool, said stationary element having mechanical stops to limit the travel of said moveable element.

4. The system of claim 3 wherein said drive means comprises a rack afixed to said blade circle support frame, a pinion mounted on said road working machine frame and driven by said rack, and a friction drive means driven by said pinion and coupled to said moveable element.

5. The system of claim 4 wherein said stationary element comprises a resistance element of a potentiometer and wherein the moveable element comprises a wiper arm of said potentiometer.

6. In a system for positioning the working tool of a road working machine with respect to a predetermined reference, said machine comprising a machine frame and a blade circle support frame, said system comprising:

sensor means adapted to be mounted on said road working machine for producing a sensor signal indicative of the deviation of said working tool from the predetermined reference;

feedback means adapted to be mounted on said road working machine having a floating range for producing a feedback signal dependent upon the position of said working tool with respect to said machine, said floating range having a limited proportional range and an integral range;

output means connected to said sensor means and feedback means for providing an output signal dependent upon said sensor signal and said feedback signal; and, position control means connected to said output means and adapted to control the position of said working tool dependent upon said output signal.

7. The system of claim 1 wherein said means connected to said sensor means and said feedback means comprises amplifier means having input means connected to said sensor means and said feedback means and an output means for providing said output signal.

8. The system of claim 7 wherein said feedback means comprises a stationary element and a moveable element positionable, with respect to said stationary element, by a drive means adapted to be responsive to the position of said machine with respect to said working tool, said stationary element having mechanical stops to limit the travel of said moveable element.

9. The system of claim 8 wherein said drive means comprises a rack adapted to be affixed to said blade circle support frame, a pinion adapted to be mounted on said road working machine frame and driven by said rack, and a friction drive means driven by said pinion and coupled to said moveable element.

10. The system of claim 9 wherein said stationary element comprises a resistance element of a potentiometer wherein the moveable element comprises a wiper arm of said potentiometer.

* * * * *

UNITED STATES PATENT OFFICE
CERTIFICATE OF CORRECTION

PATENT NO. : 3,908,765
DATED : September 30, 1975
INVENTOR(S) : ROYAL R. HAWKINS It is certified that error appears in the above-identified patent and that said Letters Patent are hereby corrected as shown below:

In claim 7, line 1, "1" should be -- 6 --.

Signed and Sealed this twenty-third Day of December 1975

[SEAL]

Attest:

RUTH C. MASON
*Attesting Officer*

C. MARSHALL DANN
*Commissioner of Patents and Trademarks*